United States Patent

Mudra

[11] Patent Number: 5,923,386
[45] Date of Patent: Jul. 13, 1999

[54] VCR CHANNEL SET UP FOR NON STANDARD TUNING ENVIRONMENTS

[75] Inventor: Robert E. Mudra, Glenview, Ill.

[73] Assignee: Zenith Electronics Corporation, Glenview, Ill.

[21] Appl. No.: 08/939,587

[22] Filed: Sep. 29, 1997

[51] Int. Cl.⁶ .................................................. H04N 5/44
[52] U.S. Cl. ......................... 348/731; 348/570; 348/563; 348/731; 345/327
[58] Field of Search ............................... 348/10, 11, 705, 348/706, 731, 732, 735, 725, 555, 724, 726–728; 386/48, 83; 345/327, 906, 6, 7, 12, 553, 563, 564, 569, 57; H04N 7/10, 5/44

[56] References Cited

U.S. PATENT DOCUMENTS 508,797  2/1893  Suizu ..................................... 358/193.1
5,748,261  5/1998  Pugel ....................................... 348/724

*Primary Examiner*—Nathan Flynn

[57] ABSTRACT

A VCR tuning system wherein broadcast channels 3/4, used for VCR tuning, has a different frequency assignment in a different tuning band. A special VCR indicia is added to the active tuning list and is accessed when VCR tuning is selected. The indicia is mapped to the corresponding frequencies of broadcast channels 3/4 as determined by the VCR flag. Non VCR indicia channel selections access look up tables corresponding to the various tuning bands in the system in the usual manner.

6 Claims, 2 Drawing Sheets

VCR CHANNEL SET UP FOR NON STANDARD TUNING ENVIRONMENTS

BACKGROUND OF THE INVENTION AND PRIOR ART

This invention relates generally to television receivers and in particular to television receivers used with VCRs and/or DVD/video disc players that are operated in the service areas of non standard television channels. As is well known, there are four distinct television channel allocation arrangements, known as "Broadcast", "ICC", "HRC" and "CATV". These channel allocation arrangements are referred to in the art as "band plans". In the HRC band plan, the frequency allocation of VCR channels 3 and 4, hereinafter referred to as channel 3/4, is offset by about one MegaHertz from the frequency allocation of Broadcast channel 3/4.

With some television receiver installations, it may not be possible to switch between a cable channel 3/4 and a VCR without retuning the television receiver because the VCR operates at broadcast channel 3/4 frequency and the cable system has an HRC tuning band allocation. While the television receiver may be retuned from the offset channel 3/4 of the cable system by tuning off of the channel and back to it, which activates the AFC, this is not acceptable to a viewer. Indeed, in some instances, with a VCR playing a "copy protected" tape, it may even be necessary to repeat the retuning procedure a number of times while the VCR or DVD is playing. The present invention solves the problem by assigning a special channel indicia or designation to the VCR channel in the system tuning software.

OBJECTS OF THE INVENTION

A principal object of the invention is to provide a novel tuning system for a television receiver used with a VCR or DVD/disc player.

Another object of the invention is to provide a VCR channel arrangement that operates in non standard tuning environments.

A further object of the invention is to provide a simple method of operating a VCR or DVD/disc player in an HRC channel tuning environment.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
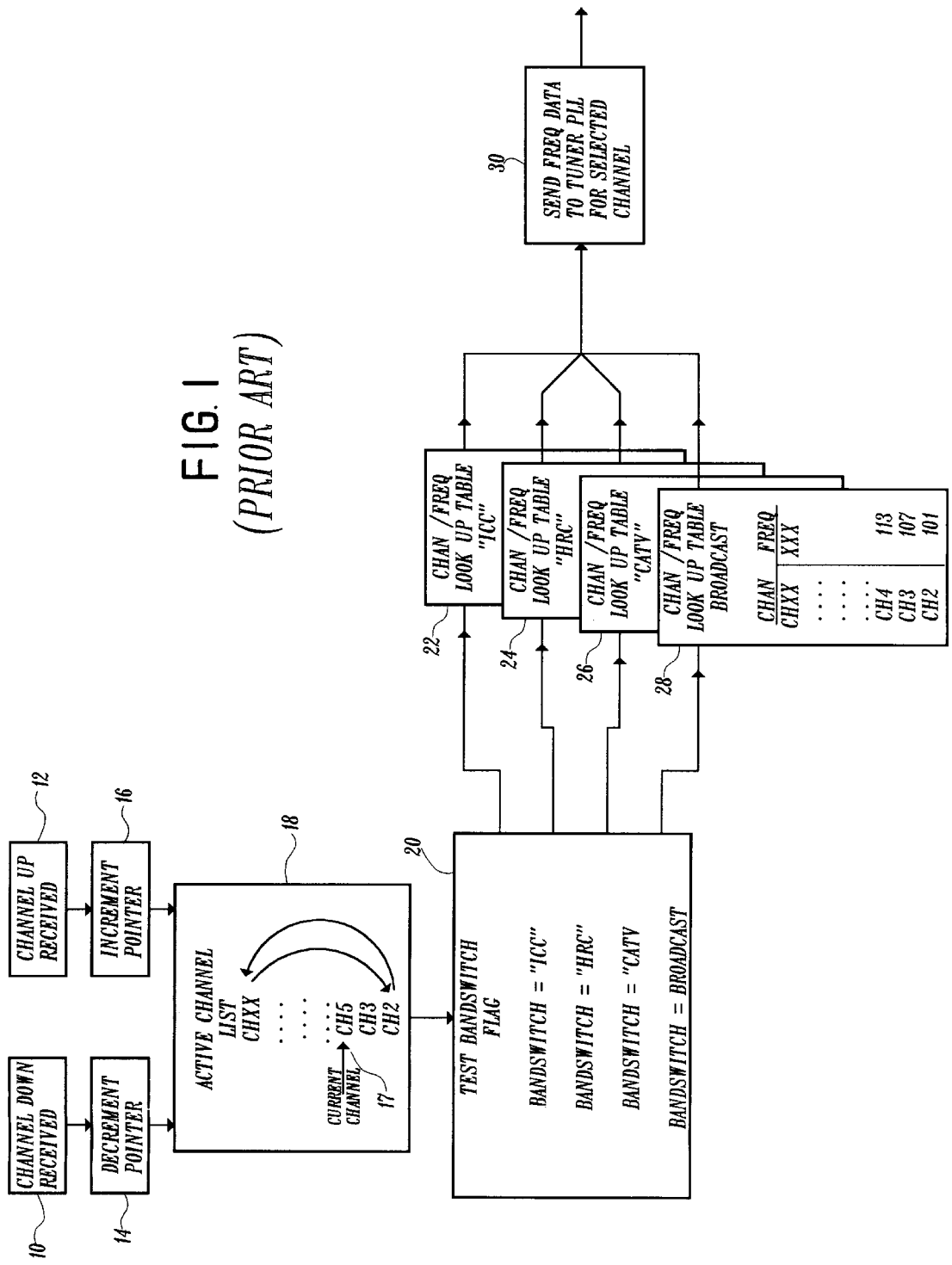
FIG. 1 is a simplified block diagram of a prior art channel selection system using global bandswitching parameters for selecting desired operating frequencies based upon selected channel numbers.

Referring to FIG. 1, a flow chart, in block form, of a prior art tuning arrangement is shown. It will be apparent to those skilled in the art that the depicted system is preferably implemented in software and controlled by a microprocessor. Blocks 10 and 12 represent the steps of making a channel UP or channel DOWN selection, via a remote control device or a viewer keypad, for example. In response thereto, a pointer 17, in an active channel list 18, is decremented as indicated by step 14 or incremented as indicated by step 16. The selected channel indicia (the channel number in prior art systems) is tested for a bandswitch flag in step 20. As indicated, the various tuning bands —ICC, HRC, CATV and Broadcast—access different channel/frequency look up tables 22, 24, 26 and 28, respectively. The correct frequency data, corresponding to the selected channel indicia for that tuning band, is sent as frequency data in step 3/40 to the tuner PLL for tuning the receiver.

As discussed above, the channel tuning frequency for channel 3/4 in the HRC band is offset by 1.25 MHz from the corresponding channel 3/4 frequency in the Broadcast tuning band. Generally speaking, if a viewer is watching channel 3/4 in an HRC band plan and then turns on a VCR, the television screen will be distorted because the VCR is operating on Broadcast channel 3/4 frequency and not on the cable channel 3/4 frequency that the television receiver is tuned to. The viewer may rectify the situation by tuning off of channel 3/4 and then tuning back to channel 3/4. This action forces the AFC system to find the channel 3/4 frequency at which the VCR is operating.

Figure 2:
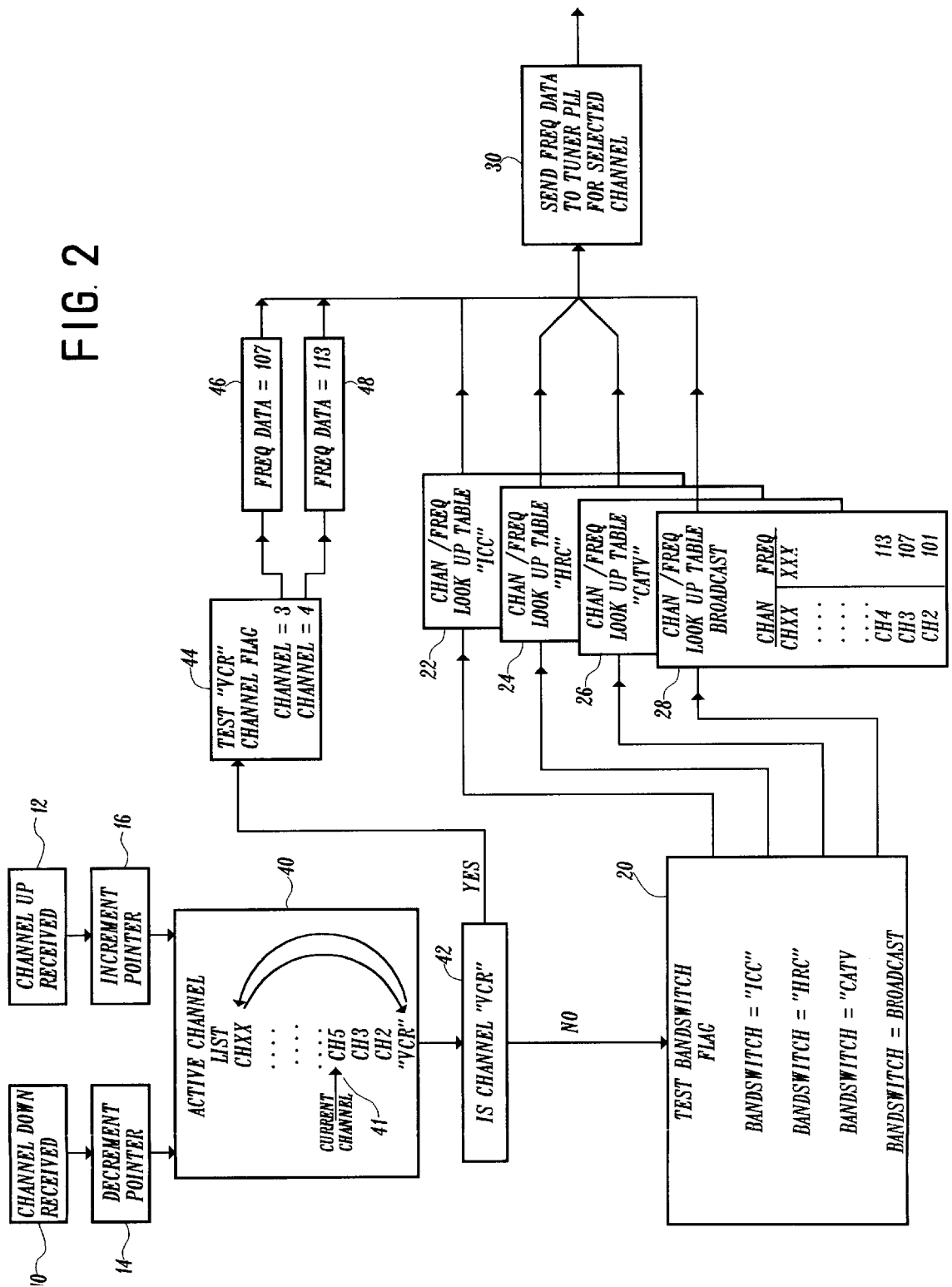
FIG. 2 is a similar simplified block diagram of a channel selection system operated in accordance with the invention.

In FIG. 2 the method of the invention is disclosed. In the active channel list 40 a VCR indicia appears as an active channel, even though the VCR indicia does not represent a channel number, as do the other channel indicia. The keypad or other tuning mechanism operated by a viewer will indicate VCR as a channel selection. Instead of tuning to channel 3/4 when using a VCR, the viewer tunes to VCR position, which causes pointer 41 to access the VCR indicia in the active channel fist 40. In step 42, the position of pointer 41 is interrogated to determine whether the VCR channel has been selected. If not, the system operates in the same manner as described for FIG. 1 to test the bandswitch flag to determine the band plan and the required tuning frequency data. If a VCR channel has been selected, step 44 tests the VCR flag for channel 3/4 setup. In steps 46 and 48, the appropriate tuning frequency data for broadcast channels 3/4 is supplied for application in step 30 to the tuner PLL. Thus, for VCR channel selections, the method of the invention simply overrides the look up tables, and outputs the frequency data for broadcast channels 3/4 as required. Thus, with the method of the invention, a VCR may be used in an environment having an HRC tuning band plan without experiencing the problems of the prior art identified above.

What has been described is a novel tuning arrangement for a VCR in an environment having a channel 3/4 frequency offset. It is recognized that numerous changes in the described embodiment of the invention will be apparent to those skilled in the art without departing from its true spirit and scope. The invention is to be limited only as defined in the claims.

What is claimed is:

1. A method of tuning broadcast channels 3/4 in a tuning system having a different frequency assignment for channels 3/4 in different tuning bands comprising:

assigning a special channel indicia for tuning to a VCR; and mapping the VCR indicia to the channel 3/4 broadcast tuning frequencies.

2. The method of claim 1, wherein the VCR indicia is included on an active channel list.

3. The method of claim 2, further comprising:

determining whether a selected channel corresponds to the VCR indicia on the active channel list.

4. The method of claim 3, further comprising:

determining whether a VCR channel flag points to VCR channel 3 or to VCR channel 4; and tuning to the frequency corresponding to the VCR channel flag.

5. A method of tuning broadcast channels 3/4 in a tuning system having a different frequency assignment for channels 3/4 in different tuning bands comprising:

assigning a special channel indicia for tuning to a VCR on an active channel list;

mapping the VCR indicia to the broadcast channel 3/4 tuning frequencies;

determining whether a selected channel corresponds to the VCR indicia on the active channel list;

determining whether a VCR channel flag points to VCR channel 3 or to VCR channel 4; and tuning to the frequency corresponding to the VCR channel flag.

6. The method of claim 5, further comprising:

providing separate bandswitch look up tables for each tuning band; testing a bandswitch flag for selected channels that do not correspond to the VCR indicia; and accessing a corresponding look up table based upon the bandswitch flag.

* * * * *